(12) United States Patent
Schauermann et al.

(10) Patent No.: US 10,001,563 B2
(45) Date of Patent: Jun. 19, 2018

(54) TRACKING AND VIRTUAL RECONSTRUCTION OF ACTIVITIES

(71) Applicant: Tourbrassie GmbH, Gauting (DE)

(72) Inventors: Norbert Schauermann, Gauting (DE); Oliver Neumann, Donaustauf (DE); Jean Blaufuß, Gauting (DE)

(73) Assignee: TOURBRASSIE GMBH, Gauting (DE)

(*) Notice: Subject to any disclaimer, the term of this patent is extended or adjusted under 35 U.S.C. 154(b) by 153 days.

(21) Appl. No.: 14/729,816

(22) Filed: Jun. 3, 2015

(65) Prior Publication Data

US 2016/0354633 A1    Dec. 8, 2016

(51) Int. Cl.
| | |
|---|---|
| A63B 69/36 | (2006.01) |
| G01S 19/19 | (2010.01) |
| G06Q 10/06 | (2012.01) |
| G06K 9/00 | (2006.01) |
| A63B 24/00 | (2006.01) |
| G01S 19/39 | (2010.01) |
| G01S 19/45 | (2010.01) |

(52) U.S. Cl.
CPC .......... *G01S 19/19* (2013.01); *G06K 9/00342* (2013.01); *G06Q 10/0639* (2013.01); *A63B 24/0003* (2013.01); *G01S 19/39* (2013.01); *G01S 19/45* (2013.01)

(58) Field of Classification Search
None
See application file for complete search history.

(56) References Cited

U.S. PATENT DOCUMENTS

| | | | | |
|---|---|---|---|---|
| 5,507,485 A | * | 4/1996 | Fisher | A63B 69/36 473/131 |
| 9,211,439 B1 | * | 12/2015 | Pedenko | A63B 24/0006 |
| 2002/0161461 A1 | * | 10/2002 | Lobb | A63B 24/0021 700/91 |
| 2005/0227791 A1 | * | 10/2005 | McCreary | A63B 69/3658 473/407 |
| 2006/0166737 A1 | * | 7/2006 | Bentley | A61B 5/1122 463/30 |
| 2007/0196800 A1 | * | 8/2007 | Douthit | A63B 24/0003 434/252 |
| 2007/0197314 A1 | * | 8/2007 | York | A63B 57/00 473/407 |
| 2007/0298895 A1 | * | 12/2007 | Nusbaum | A63B 69/36 473/131 |
| 2011/0156868 A1 | * | 6/2011 | Hoeflinger | A63B 24/0021 340/8.1 |
| 2011/0263345 A1 | | 10/2011 | Balardeta et al. | |

(Continued)

*Primary Examiner* — Jason Yen
(74) *Attorney, Agent, or Firm* — Saliwanchik, Lloyd & Eisenschenk

(57) ABSTRACT

Methods and systems for reconstructing a player's activity are provided. A method can include retrieving data related to a player, obtained during an activity, calculating estimates of features of the activity based on the data, receiving user input related to the features of the activity responsive to at least one of the estimates of features of the activity based on the data, and reconstructing at least a part of the activity based on the estimates of features of the activity based on the data and the user input. The player's activity can be a ball game, such as a game of golf.

17 Claims, 7 Drawing Sheets

(56) References Cited

U.S. PATENT DOCUMENTS

| | | | |
|---|---|---|---|
| 2012/0088544 A1* | 4/2012 | Bentley | A63F 13/06 455/556.1 |
| 2013/0029790 A1 | 1/2013 | Clark | |
| 2013/0102419 A1* | 4/2013 | Jeffery | A63B 69/00 473/409 |
| 2013/0165246 A1* | 6/2013 | Jeffery | A63B 69/36 473/223 |

* cited by examiner

TRACKING AND VIRTUAL RECONSTRUCTION OF ACTIVITIES

TECHNICAL FIELD

The present disclosure relates to a method and a device for tracking of or reconstructing a player's activity. In particular, the present disclosure may relate to a reconstruction of activities involving one or more items, such as pieces of sports equipment and, more particularly, to a reconstruction of a round of golf.

BACKGROUND OF THE INVENTION

A reconstruction of activities of a player is required in various areas, such as monitoring and tracking of players and calculating statistics based on a respective performance of a player. Typically, individual activities of a player, such as preparation for a game, play or tournament or the progression of a play, game or tournament are either monitored by an external observer or memorized by the player in order to subsequently reconstruct the activity. In various areas, score cards are used or similar notes are taken during activities to aid in reconstructing the activity from memory.

Obviously, such approaches either require additional manpower to collect the data or are error-prone, since they completely rely on individual manual notes and facts memorized by the player.

In the area of golfing, several approaches propose to track a golfer's activity using sensor devices. For example, US 2013/0029790 A1 discloses a golf performance tracking and mapping device with an optical sensor for reading waypoints along a course map, which can be used to catalogue strokes and distances. US 2002/0161461 A1 describes an apparatus for tracking locations and distances on a golf course in order to recommend a club selection and record performance statistics of a golfer. These and similar approaches allow for tracking of parameters related to the player during a round of golf. However, this data is limited to individual characteristics and cannot be used for reconstructing the player's activity.

In view of the above, one object is to enable reconstruction of a player's activity. In particular, one object is to improve the reconstruction based on data related to a player obtained during the activity.

BRIEF SUMMARY

One or more limitations of the existing technology are solved by embodiments of the subject method for reconstructing a player's activity and embodiments of the subject device for reconstructing a player's activity as defined in the independent Embodiments. Preferred embodiments are defined in the corresponding dependent Embodiments described in the Embodiments section.

Specific embodiments of the subject invention provide a method for reconstructing a player's activity, the method including retrieving data related to a player, said data obtained during an activity, calculating estimates of features of the activity based on the data, receiving user input related to the features responsive to at least one of the estimates, and reconstructing at least a part of the activity based on the estimates and the user input.

Embodiments of the subject method according to the present disclosure may be a computer-implemented method. In particular, the method may be implemented and executed on a hardware device and may configure the hardware device to perform individual steps of the method. The method enables a reconstruction of the player's activity based on individual data of the player obtained during the activity. Preferably, at least a part of the activity may be reconstructed based on features of the activity, such as performance characteristics of the player, that are based on automatically calculated estimates of the features as well as user input related to the features. Hence, the method uses previously recorded data to calculate estimates which can be further characterized by user input in order to reconstruct at least a part of the activity. This allows for an accurate and efficient automatic or semi-automatic reconstruction of the activity.

The activity of a player may correspond to various activities, such as a preparation of a game, play or tournament or a progression of a game, play or tournament. For example, the activity may be a sports activity, a preparation activity or any similar activity performed by the player.

The data related to the player may be obtained during the activity and temporarily stored for subsequent processing. For example, the data may be obtained using various sensors attached to the body or clothing of the player or included in a portable device which may be carried by the player during the activity. The data may be at least partially directly processed during the activity, thereby enabling live tracking of the player, or stored or transmitted for subsequent processing or post-processing after the activity has been finished. The online processing and/or subsequent post-processing may be at least partially performed on a server and/or locally on a device.

The estimates calculated based on the data refer to features of the activity, such as individual performance characteristics of the player. The features may be determined by a type of the activity and may characterize the activity or a progression of the activity with regard to temporal or spatial goals achieved by the player, such as a number of attempts to achieve a particular goal, individual spatial performance or achievement of the player and the like. For example, a feature may relate to a shot of a ball or any other interaction with a piece of sports equipment. The data may either directly measure the feature or a respective performance characteristic or may indicate occurrence of the feature in order to calculate the one or more estimates of the features based on the data.

Responsive to at least one of the estimates, a respective user input related to the features may be taken into consideration in order to reconstruct at least a part of the activity. Preferably, a user may be provided with at least one indication of the estimated features and may provide a respective user input. The user input may include further details on the estimated feature, a modification of the estimated feature or an adjustment or update of the estimated feature and the like. For example, the user, which may be the player or any other person, may reconstruct a particular performance directed at the feature from memory and provide respective user input in response to the estimates. Hence, the estimates presented to the user may help the user to recall particular feature or performance characteristics of the activity and provide respective user input.

Both, the estimates and the user input are used to reconstruct at least a part of the activity. For example, the estimates can be used as basis for reconstruction and may be further updated, adjusted or modified based on the user input in order to reconstruct (the progression of) the part of the activity or the whole activity.

The activity may be defined as a one- or n-dimensional set of features. Furthermore, the activity may comprise a set of indications defining the features of the reconstruction of the activity. For example, an activity may define a set of temporal or spatial goals to be achieved by the player, which may be used to calculate the estimates and reconstruct at least a part of the activity.

In an embodiment, said calculating of estimates includes analyzing one or more motion trajectories of the player tracked during the activity. A motion trajectory may reflect a series of positions or locations of the player during the activity or a motion of body parts of the player, such as a motion of the head, individual limbs and the like. The analysis of the one or more trajectories of the player may be compared to a motion pattern and/or acceleration profile. The motion pattern may indicate occurrence of features and events of the activity. The motion trajectories may also include one or more of speed, acceleration, impact, angular velocity and angular speed of the player or body parts of the player, in any combination. The data of the motion trajectories may be directly derived from data measured by one or more sensors, which may be attached to the body of the player or to individual body parts of the player or pieces of sports equipment in any combination, or may be computed based on the measured data. The data in each motion trajectory may also be marked with a time stamp in order to enable a joint or synchronous analysis of multiple motion trajectories of the player. For example, data samples of a motion trajectory may be interpolated in order to estimate a data value of the motion trajectory for a desired point in time, for example, according to a time stamp of a data sample of another motion trajectory. This is advantageous, since motion trajectories of the player may be tracked automatically without requiring any input from the player during the activity. Hence, the data may be obtained in a non-disturbing or even an invisible way. In order to estimate the features of the activity, the data may be further processed to estimate individual performance characteristics of the player which can be, but need not to be related to a motion of the player. For example, the motion of a limb of the player could be used to estimate a performance characteristic related to an interaction with a piece of sports equipment. Similarly, a position or speed of the player may be used to estimate a position of an interaction with a piece of sports equipment, such as occurrence of a shot of a ball or a position of a ball.

Preferably, the activity includes an interaction of the player with one or more items, wherein said calculating of estimates includes estimating one or more positions of the one or more items during the activity based on the motion trajectory of the player. The one or more items may correspond to one or more pieces of sports equipment, such as a racket, a club or a ball.

Preferably, the data related to the player may further include data indicative of an interaction of the player with the one or more items. For example, the data may relate to an interaction of the player with a club or a ball and the data may indicate a shot activity based on data from accelerometers or an increase of speed of the player or individual limbs of the player. Furthermore, the motion trajectory of the player may indicate a location of interaction with the item and accordingly, a position or a location of the item at a particular point in time. This is advantageous, since based on automatically tracked motion trajectories of the player, positions of items, such as a ball, can be automatically estimated, which may help the user to recall the actual interaction with the item and modify, adjust or update the estimate accordingly. This leads to a more precise reconstruction of the activity.

Preferably, the one or more positions of the one or more items are estimated based on temporal or spatial characteristics of the one or more motion trajectories of the player. In particular, at least one motion trajectory may reflect a motion of the player on a playing field or court and the motion trajectory of the player may be analyzed with regard to typical temporal or spatial characteristics indicative of an interaction with the one or more items, such as motion patterns or acceleration profiles. For example, the motion trajectory may indicate an acceleration of the player before or after interaction with the one or more items. Similarly, the motion trajectory may indicate a searching activity characterized by a low speed of the player in a limited spatial range directly before the interaction with the item and/or an acceleration of the player directly after interaction with the item. Furthermore, two or more motion trajectories may be analyzed in order to estimate the one or more positions of the one or more items and/or a respective interaction with the one or more items during the activity. For example, a motion trajectory reflecting a series of positions of the player on the playing field or court may be analyzed as indicated above in order to indicate a potential interaction with the item. A respective time range of the motion trajectory may be marked as a potential interaction. Furthermore, a second motion trajectory, which may be directed at a motion of a body part of the player may be analyzed with regard to another motion pattern defining an interaction with the item. An example of a motion pattern may be a slow upward motion starting from an idle position or state, then a fast downward acceleration, followed by a detected impact combined with a rapid slowdown of the motion, which may be again followed by an accelerated motion. If one or more of the criteria of the motion pattern are met in the second motion trajectory, a respective range may be indicated as a potential interaction. Thereafter, if both ranges marked as a potential interaction coincide in both motion trajectories, this may lead to an estimation of an interaction with the item. It is to be understood, that two, three, four or more motion trajectories reflecting motion and acceleration of the body and body parts of the player may be used to provide estimates of interactions with items in order to enable a reliable estimation of positions of the items during the activity.

Preferably, any estimates of features based on motion trajectories may be validated according to rules of the activity, information directed at a playing field or court, or other personal information of the player. Invalid estimates may be discarded. Furthermore, the validation may result in a value indicating a likelihood of validity of a particular estimate, which may be further taken into consideration during reconstruction of the activity.

Preferably, the temporal or spatial characteristics of the one or more motion trajectories of the player are analyzed in one or more ranges of the motion trajectories related to each estimated position of the one or more items. For example, a motion trajectory may be initially analyzed with regard to temporal or spatial characteristics in order to provide a first estimate of a first position of the item. Additionally or as an alternative, the first estimate may be used to define a time range or interval on the motion trajectory to refine the first estimate. The time range may be a time range of a predetermined duration or may be adaptively adjusted according to characteristics of the motion trajectory, such as local speed values. Similarly, the motion trajectory may be analyzed with regard to a spatial area of a predetermined or adaptive size.

According to a preferred embodiment, the method further comprises retrieving player-dependent characteristics and analyzing the motion trajectory according to the player-dependent characteristics. The player-dependent characteristics may serve as an input for the analysis of the motion trajectory in order to derive estimates of the features, for example, based on estimated performance characteristics of a particular player. The player-dependent characteristics may indicate motion characteristics that are typical for the particular player, such as an average walking or running speed and the like, which may be used to more precisely determine the features of the activity, such as an interaction of the player with one or more items of sports equipment. Similarly, the player-dependent characteristics may reflect statistics of the player, for example personal shot statistics, which can be used to derive a distance between positions of a ball or another piece of sports equipment the player is interacting with.

Accordingly, in a preferred embodiment, the method further comprises comparing the player-dependent characteristics with the estimated positions of the one or more items. As an example, the player may use different clubs to interact with a ball, which information may be used to refine the estimated positions of the ball. The data obtained during the activity or the user input may indicate a chosen club at a particular position and this information can be used to determine a suitable range for an estimate of a next position of the ball.

In another embodiment of the present disclosure, the method further comprises updating the player-dependent characteristics based on the reconstructed activity. Accordingly, the player-dependent characteristics may be learned based on the reconstructed activity. For example, the player-dependent characteristics may be used to refine estimates of features of the activity, based on performance characteristics of the player, which may be further adjusted based on user input in order to reconstruct the activity. After a successful reconstruction of the activity, the player-dependent characteristics may be compared and updated according to the reconstructed activity.

In yet another embodiment, said user input includes an adjustment of at least one of the estimated one or more positions of the one or more items. For example, the user may be provided with an indication of the estimated one or more positions of the one or more items and may interactively adjust at least one of the one or more positions of at least one of the items. The results of the interaction may be provided as user input and used to reconstruct the activity. For example, a position of a ball may be estimated according to player-dependent characteristics and/or the one or more motion trajectories of the player. However, the activity may allow for a change of the position of the ball, for example, if the ball was determined to be offside or out of bounds or in a position which does not allow further interaction with the ball. For example, in the game of golf, the ball may have landed in a water hazard and the player may have been forced to drop the ball at a new position. Based on the user input the position of the ball may be adjusted to reflect the starting point of a next shot.

In yet another embodiment, said user input further includes data indicative of a next position of the one or more items, the method further comprising estimating the next position of the one or more items based on the motion trajectory of the player and said data indicative of the next position of the one or more items. For example, the user input may indicate a chosen club and/or lie, which data may be used to calculate a laylength or a flight path of the ball assuming an average shot in direction of a pin, which results in a next position of the ball. Furthermore, personal shot statistics may be used as player-dependent characteristics in combination with a chosen club and/or lie in order to estimate the next position of the ball.

In yet another embodiment, the method further comprises receiving an indication of a number of consecutive positions of the one or more items during the activity. The indication of the number of consecutive positions may be part of the user input or may be received as an initial indication, which may be used to calculate the estimates of the features of the activity. For example in the game of golf, the indication may relate to the score, i.e., the number of shots required at a particular hole of the course, which may be directly used to determine the number of consecutive positions of the ball at the hole. For example, the indication may be one of a par, birdie, eagle, double eagle or albatross, as well as bogey, double bogey, triple bogey and the like. The score may be compared to characteristics of the hole of the course, such as par 3 or par 4 in order to derive the number of shots required by the player to finish the hole by the player and a respective number of positions of the ball used to calculate the estimates of the features of the activity.

In yet another embodiment, the method further comprises generating a replay of the reconstructed activity. For example, the reconstructed activity may define features of the activity, such as several consecutive positions of the one or more items, such as positions of pieces of sports equipment or positions of a ball on a course or court, and the data may be provided to a physics and/or graphics engine which may use the features and data on the course or court in order to generate a visual representation of the progression of the activity. For example, the replay may correspond to an interactive three-dimensional visualization of the course or court which may be simulated over time in order to represent individual interactions of the player with the items or with the ball. For example, the replay of the reconstructed activity may be an animation of the activity, such as an animated fly-over, preferably based on reconstructed shots and positions of a ball on a golf course. The reconstruction may be provided as digital media, including audio and/or video data. The reconstruction may also be provided as a media stream.

Preferably, the activity is a round of golf played by a golfer. The one or more items may correspond to a ball. The reconstructed part of the activity may correspond to one or more holes of a golf course on which the round of golf was played. Preferably, the method further comprises receiving data related to the round of golf. For example, the data may include a tee position and a pin position. The tee position and pin position may be automatically determined using data related to the golf course and may be further adjusted based on user input.

In yet another embodiment, said calculating estimates further includes taking into consideration data indicative of a golf course on which the round of golf was played. The data may be used to derive a course map and particular areas of the course, such as a teeing ground, the fairway, one or more bunkers, the rough, water hazards, indications of outer bounds, the putting green, the pin and the hole and the like.

In yet another embodiment, the method further comprises receiving user input indicative of a state of the golf course at an estimated position of the ball. For example, further to the data indicative of the golf course, the user may recall a particular state of the golf course at an estimated position of the ball and may use respective interactive elements to define the state, such as rough, semi-rough, fairway, green and the like.

Preferably, any input of the user may be provided via a graphical user interface, which may visualize the golf course and any data on the golf course which may have been previously retrieved. Furthermore, the user interface may indicate the data obtained during the activity, such as at least one of the one or more motion trajectories of the player tracked during the activity. The user interface may include further interactive elements to enable adjustments of the calculated estimates of the features and performance characteristics, for example, adjusting an estimated position of a ball played by the player, or to provide further input which may be used to refine the calculation of the estimates, such as a particular score on a hole or a selection of a club and/or lie for a shot.

According to yet another embodiment, the method further comprises calculating statistics of the player. A calculation of statistics of the player may be based on the reconstructed part of the activity, such as based on the reconstructed round of golf. Furthermore, the statistics may be based on the provided user input. The calculation of the statistics may also further include a determination of personal strengths and weaknesses of the player.

The terms "or" or "and/or" as used throughout this description refer to an inclusive or logical disjunction. Hence, the terms "A or B" and "A and/or B" mean A or B or both, A and B.

According to another aspect of the present disclosure, a device for reconstructing a player's activity is provided, the device comprising a memory, an input interface, and a processor. The device may be a hardware device, such as an electronic device. The memory may be configured to store data related to a player, wherein said data is obtained during an activity of the player. The processor may be configured to retrieve the data, calculate estimates of features of the activity based on the data, and may access the input interface to receive user input related to the features responsive to at least one of the estimates. The processor may be further configured to reconstruct at least a part of the activity based on the estimates and the user input.

In a preferred embodiment, the device may further comprise one or more sensors configured to obtain said data and store the data into the memory.

Preferably, the one or more sensors may include at least one of a GPS sensor, an accelerometer, an RFID sensor, and an optical sensor, preferably in any combination. For example, an optical sensor may be a range finder such as a laser range finder which may be used during the activity to determine a current distance to a predetermined object, such as the green, a pin and the like. Any sensor may be actively operated by the player to provide a data sample of the data obtained during the activity. However, it is to be understood that the sensors may also operate automatically without any interaction of the player.

According to one embodiment, the device is a portable electronic device, including a tablet computer, a smartphone or a smart watch. Preferably, the device may be a portable device which the player may conveniently carry during the activity in order to obtain the data.

In one embodiment, the device may be an offline device for reconstructing the player's activity and need not to include any sensors. Rather, according to another aspect of the present disclosure, a sensor may be provided to obtain data related to a player during an activity, which sensor may be configured to temporarily store the obtained data and/or to transmit the data to a device or server for reconstructing a player's activity for offline processing according to embodiments of the present disclosure.

Preferably, the processor of the device according to one embodiment may be configured to perform individual processing steps of the method according to one or more embodiments of the present disclosure and the method according to yet another embodiment of the present disclosure may reflect a functional configuration of the device or its components for reconstructing a player's activity according to one or more embodiments of the present disclosure, in any combination.

According to yet another aspect of the present disclosure, a computer-readable medium having instructions stored thereon is provided, wherein said instructions, in response to execution by a computing device, cause said computing device to automatically perform a method according to embodiments of the present disclosure.

In particular, said computing device may correspond to the device for reconstructing a player's activity according to embodiments of the present disclosure and may perform a method comprising the steps of retrieving data related to a player, obtained during an activity, calculating estimates of features of the activity based on the data, receiving user input related to the features responsive to at least one of the estimates, and reconstructing at least a part of the activity based on the estimates and the user input.

According to one or more embodiments of the computer-readable medium, the computing device may be configured to automatically perform any of the processing steps defined by one or more embodiments of the method according to the present disclosure. Also, the computer-readable medium may be accessed by any device or sensor according to embodiments of the present disclosure and may configure the device or sensor to perform respective steps of a method according to embodiments of the present disclosure.

BRIEF DESCRIPTION OF THE DRAWINGS

The specific features, aspects and advantages of the present disclosure will be better understood with regard to the following description and accompanying drawings where.

DETAILED DESCRIPTION

In the following description reference is made to the drawings which show by way of illustration various embodiments. Also, various embodiments will be described below by referring to several examples. It is to be understood that the embodiments may include changes in design and structure without departing from the scope of the claimed subject matter.

Figure 1:
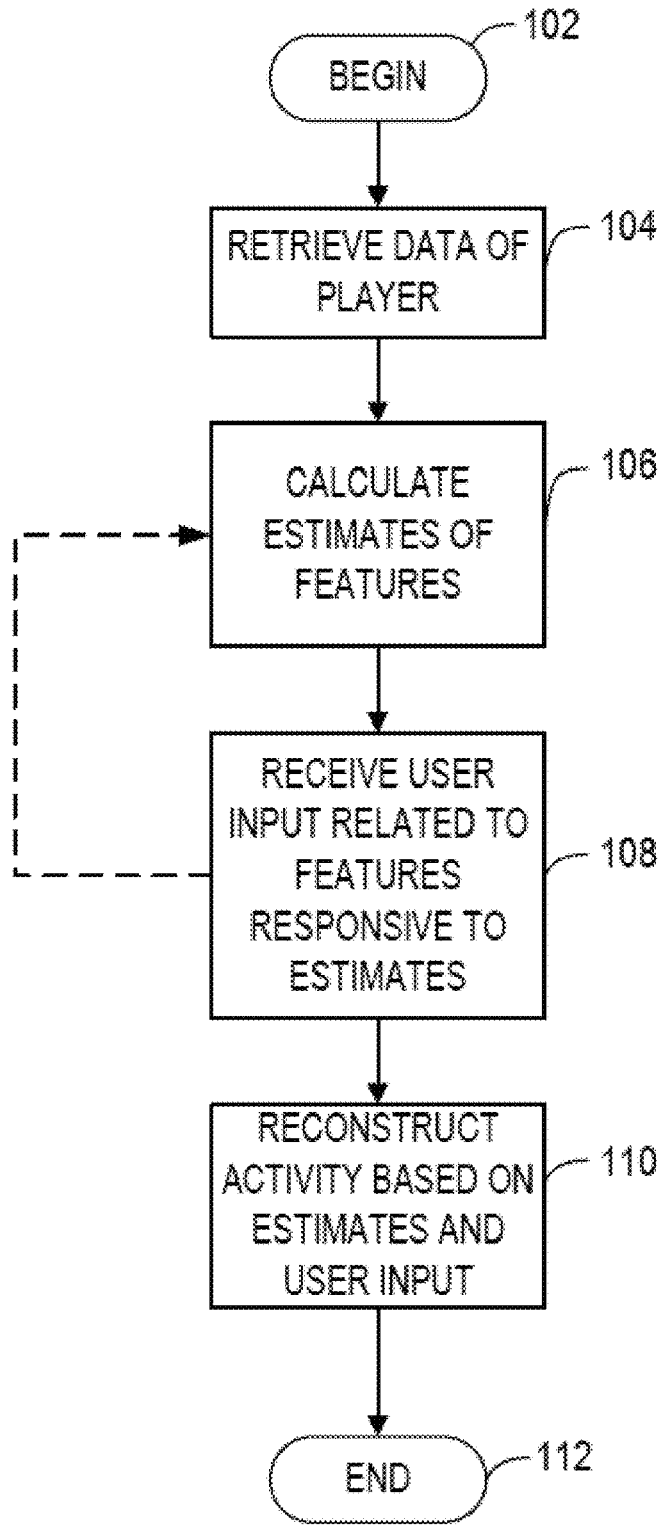
FIG. 1 shows a flow chart of a method for reconstructing a player's activity according to an embodiment of the present disclosure.

FIG. 1 shows a flow chart of a method for reconstructing a player's activity according to one embodiment of the present disclosure. The method 100 may start in item 102 and may proceed with item 104, wherein data related to a player that have been obtained during an activity are retrieved. The data may be tracking data or any other data retrieved from sensors which may be attached to the body or clothing of the player in order to monitor interaction of the player with pieces of sports equipment, such as with a ball.

The method may proceed with item 106, wherein estimates of features of the activity may be calculated based on the data. The features may variously refer to an interaction of the player with pieces of sports equipment and may, for example, include a position of the sports equipment at a particular point in time, an interaction of the player with the sports equipment, characteristics of the interaction with the sports equipment, performance characteristics of the player, and the like. Preferably, the features may relate to a position of a ball and respective shot characteristics. Accordingly, based on the data retrieved in item 104, the interaction of the player with the piece of sports equipment can be estimated in item 106.

The method 100 may proceed with item 108, wherein user input related to the features may be received. The estimate may be provided to a user, who may be the player or any other person or operator, in order to enable interaction of the user based on the estimated features. For example, the user may modify, adjust or refine the estimated features based on further notes taken during the activity or recalled from memory. For example, the user may adjust a position of a ball and further supply data related to a chosen sports equipment, such as a chosen club and/or lie.

Furthermore, as indicated by the dotted arrow between items 108 and 106, further estimates may be iteratively calculated based on user input.

The method may proceed with item 110, wherein at least a part of the activity is reconstructed based on both, the estimates and the user input. For example, the estimates may be used as a basis for reconstruction of the at least a part of the activity and the user input may be used to refine the estimates. The method may end in item 112.

Figure 2:
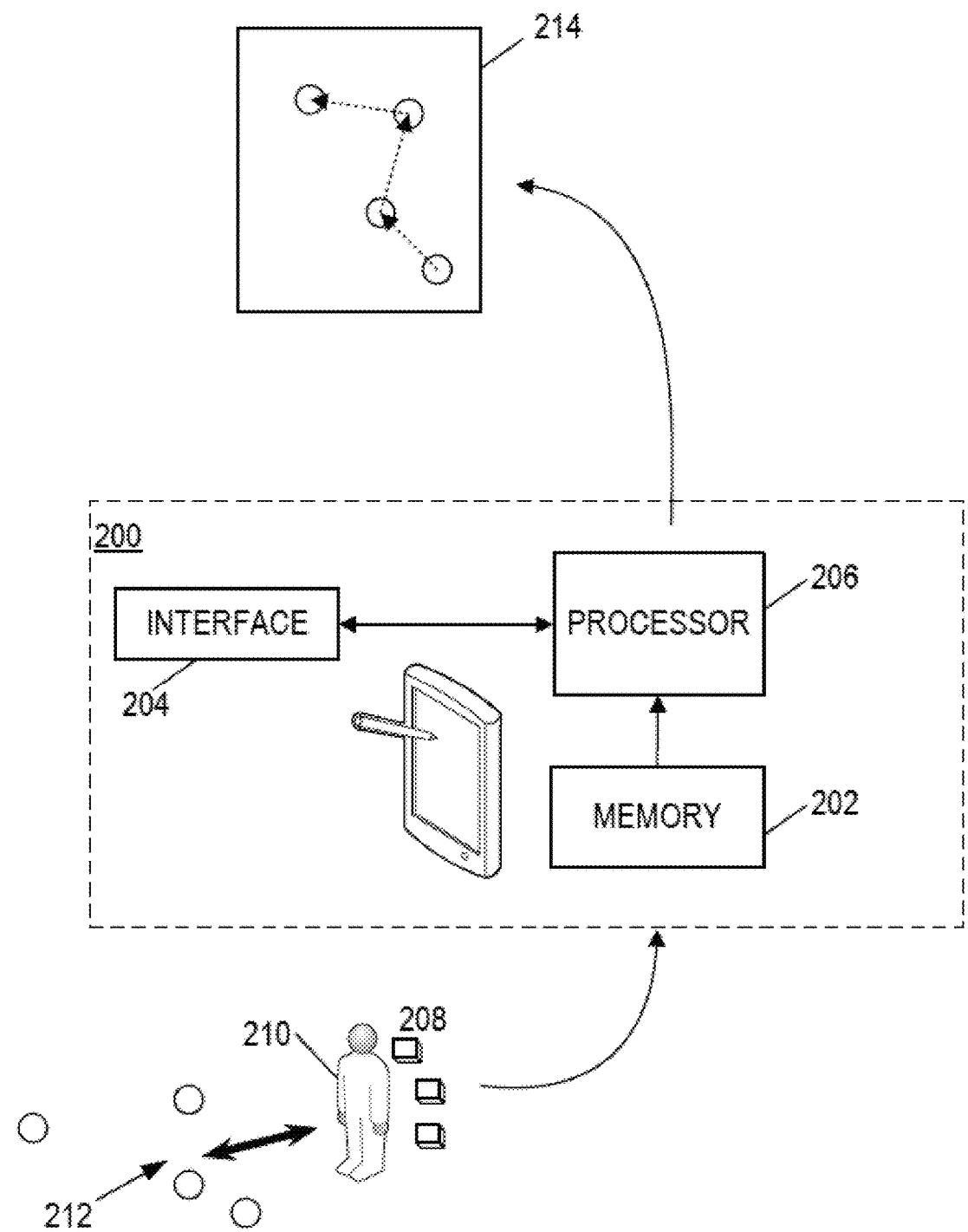
FIG. 2 shows a schematic view of a device for reconstructing a player's activity according to an embodiment of the present disclosure.

FIG. 2 shows a schematic representation of a device for reconstructing a player's activity according to one embodiment of the present disclosure. The device 200 may be an electronic device including hardware components and software modules. For example, the device 200 may be a portable device, such as a tablet or a laptop, as depicted in FIG. 2. However, the device 200 is not restricted to a particular type of electronic device and may rather comprise any of a smart watch, a smartphone, a personal computer and the like.

The device 200 may comprise a memory 202, a user interface 204 and a processor 206. The memory 202 may be configured to store data from one or more sensors 208 that may be attached or otherwise associated with a player 210 in order to track the player 210 during an activity.

Even though FIG. 2 shows the device 200 and the one or more sensors 208 as two distinct elements, it is to be understood that the one or more sensors 208 may also form part of the device 200. For example, the device 200 may be a smartphone comprising a GPS sensor, a plurality of accelerometers, RFID sensors and optical sensors. The player 210 may carry the smartphone during the activity. However, the one or more sensors 208 may also be dedicated sensors which may be attached to the clothing of the player 210 in a non-disturbing way, such as lightweight sensors or activity trackers, or which may even be integrated into the clothing of the player 210, such as wearable computing sensors.

As depicted in FIG. 2, the activity of the player 210 may be an interaction of the player 210 with one or more pieces of sports equipment, such as one or more balls 212. For example, the player 210 may use a racket or a club to interact with the ball 212 during the activity. Accordingly, the various instances of the ball 212 may represent a plurality of consecutive positions of the ball 212 during the activity.

The one or more sensors 208 may track motion of the player 210 during the activity, register pieces of sports equipment used by the player 210, detect events, for example, impact on or acceleration of the player, and/or provide any data related to the player 210 during the activity. At least some of the one or more sensors 208 may be identical sensors in order to provide redundant data related to the player during the activity which may increase precision of the data or compensate for a failure of a sensor. However, the one or more sensors 208 may also be different sensors, each directed at a particular type of data related to the player 210 during the activity.

The one or more sensors 208 may temporarily store the tracked data in an internal storage and the data may be retrieved by the device 200 after the activity. However, the one or more sensors 208 may also be configured to directly transmit the retrieved data to the device 200 or to another external storage or storage device, such as to a server, in order to enable an online or subsequent retrieval of the data related to the player and reconstruction of the activity.

The processor 206 of the device 200 may use the data of the one or more sensors 208 to calculate estimates of features of the activity, including performance characteristics of the player 210. For example, the data may represent a motion trajectory of the player during the activity and the processor 206 may be configured to estimate consecutive positions of the ball 212 during the activity based on the motion trajectory. For example, the processor 206 may use a model, including one or more motion patterns and/or acceleration profiles, which may specify a slower motion of the player 210 before an interaction with the ball 212, which may be indicative of a searching activity with regard to the ball 212, a rapid and short acceleration during the interaction with the ball 212, which may be indicative of a shot, and an acceleration of the player 210 to a pre-determined speed after the interaction with the ball which may be indicative of walking or running of the player 210 in a direction of the next position of the ball. If the data match a motion pattern or acceleration profile of the model, a respective position or a corresponding time specified by the data may be identified as a potential hit.

In order to further increase the reliability of the estimation, further data of the player may be used to confirm the estimate. For example, data from a sensor measuring motion and/or acceleration of a limb of the player, such as an activity tracker or any similar hardware attached to the limb or to the body of the player, may be used to verify the potential hit. As an example, the further data may be compared to another motion pattern and/or acceleration profile which may define an upward motion of an arm from an idle position, followed by a fast downward motion, detection of an impact or a corresponding slowdown of the arm, which may again be followed by a slower downward motion corresponding to the follow-through of a completed swing. If also the further motion pattern and/or acceleration profile is reflected in the data, the potential hit may be confirmed and used to indicate an interaction with the ball at the respective position or a corresponding time as specified by the data.

In a preferred use case, a recognition of a hit may be based on the synchrony of two measurements or data series from at least two different sensors, such as a GPS-based sensor and a motion or acceleration sensor. The GPS measurement may be analyzed with regard to respective time ranges, such as at least 10 seconds, preferably between 30 seconds and five minutes and most preferably of one of 30 seconds, 1 minute, or 2 minutes, within a predetermined radius, such as a radius of at least 5 meters, preferably between 7 meters and 20 meters and most preferably of one of 10 meters, 15 meters and 20 meters. These conditions may be defined as initial conditions for a potential hit. It is to be understood that all sensor data may be preprocessed in order to identify and eliminate outliers or spikes, which may be caused by biased satellite signals or interfering signals in the environment of the sensor. For example, the data series from a sensor may be filtered, transformed and analyzed in order to remove noise and other artefacts from the sensor data.

Additionally or as an alternative to the comparison of a potential hit with further data of the player, an estimated interaction with the ball may be validated according to rules of the activity. For example, the position of the player on the golf course may be compared with data of the course. Furthermore, consecutive positions of the ball may be compared with each other. For example, a threshold distance, such as 400 meters may indicate a missing or unidentified interaction with the ball therebetween, since the threshold distance cannot be achieved by a single interaction with the ball. Furthermore, a calculated motion speed based on GPS data may be compared to a validity range or threshold in order to identify GPS measurement errors and/or outliers.

The calculated estimates may be presented to a user (not shown) via an interface 204 of the device 200, which may be a graphical user interface enabling multi-modal output and multi-modal input. The user may be identical with the player 210. However, it is to be understood that the user may also be any other operator of the device 200. The estimates may be presented via the interface 204 as for example described below with regard to FIGS. 3 to 7. The estimates of interaction may be used to generate an initial reconstruction of the features of the activity. However, since each activity may reflect an individual performance of the player, the user may review, confirm, discard, adjust, update and/or modify the estimates and provide further input directed at the features, such as individual performance characteristics of the player 210. For example, the user may utilize notes of the player 210 taken during the activity, such as a score card or the user may recall from memory a particular situation corresponding to an estimate and may provide respective user input via the interface 204.

The processor 206 may be configured to receive the user input related to the features and may combine both, the calculated estimates and the user input to reconstruct at least a part of the activity, as indicated by element 214, which may include a graphical representation of consecutive positions of the ball 212 during the activity.

Accordingly, the device 200 may enable an automatic or semi-automatic reconstruction of the player's activity based on data obtained during the activity, which further enables a user to provide respective user input based on the automatically calculated estimates. Accordingly, the user may easily reconstruct a progression of the activity aided by the device 200 resulting in a simplified reconstruction of the activity with an increased precision.

The device 200 may be preferably applied to reconstruct a round of golf. The data obtained during the activity may refer to position or location data of the player 210 during the round of golf which may, for example, be retrieved using a GPS sensor or other positioning sensors. In particular, the device 200 may be a smart phone and the player 210 may start tracking of the position or location data directly before the round of golf. Furthermore, the player 210 may use an activity tracker or smart watch, which may be attached to an arm of the player 210. After starting of the tracking, the player 210 may put the smartphone into a pocket or a golf bag. The player 210 needs not to interact with the smartphone or activity tracker during the round of golf and may keep the smartphone invisible during the entire round of golf in order to comply, for example, with particular regulations directed at usage of electronic aids or tools during a round of golf. After completion of the round of golf, the smartphone may be used to reconstruct the round of golf based on a motion trajectory of the player 210 and/or the data of the activity tracker. The estimated features and performance characteristics of the player 210 may indicate consecutive positions of shots of the player 210 and, hence, consecutive positions of the ball 212 with regard to one or more holes of the golf course. The player 210 may further use a score card or may recall from memory the individual situations, a chosen club or an applied lie for a particular shot, which may further be used to update the estimates with regard to a next position of the ball, in order to reconstruct the performance at a hole or the performance during the whole round of golf.

The smartphone may, for example, further include program code, such as an application or an app, which may directly allow for initiation of the tracking and reconstruction of the round of golf. The program code may be executed on the processor 206 and may enable interaction with the player 210 via the interface 204. The program code may also be configured to communicate with the activity tracker in order to directly retrieve the measured data. It is to be understood that the program code may be suitable for a subsequent analysis and reconstruction of the round of golf and/or a live reconstruction of the data which may include a communication with a server and which may enable a live tracking of the player 210 during the round of golf.

The device 200 may be configured to present via interface 204 any of the user interfaces as discussed below with regard to FIGS. 3 to 7. Furthermore, the device 200 may be configured to perform one or more items of method 100 as discussed with regard to FIG. 1, in any combination. For example, processor 206 may be a multi-core processor and one or more items of method 100 of FIG. 1 may be performed sequentially or in parallel in any combination.

Figure 3:
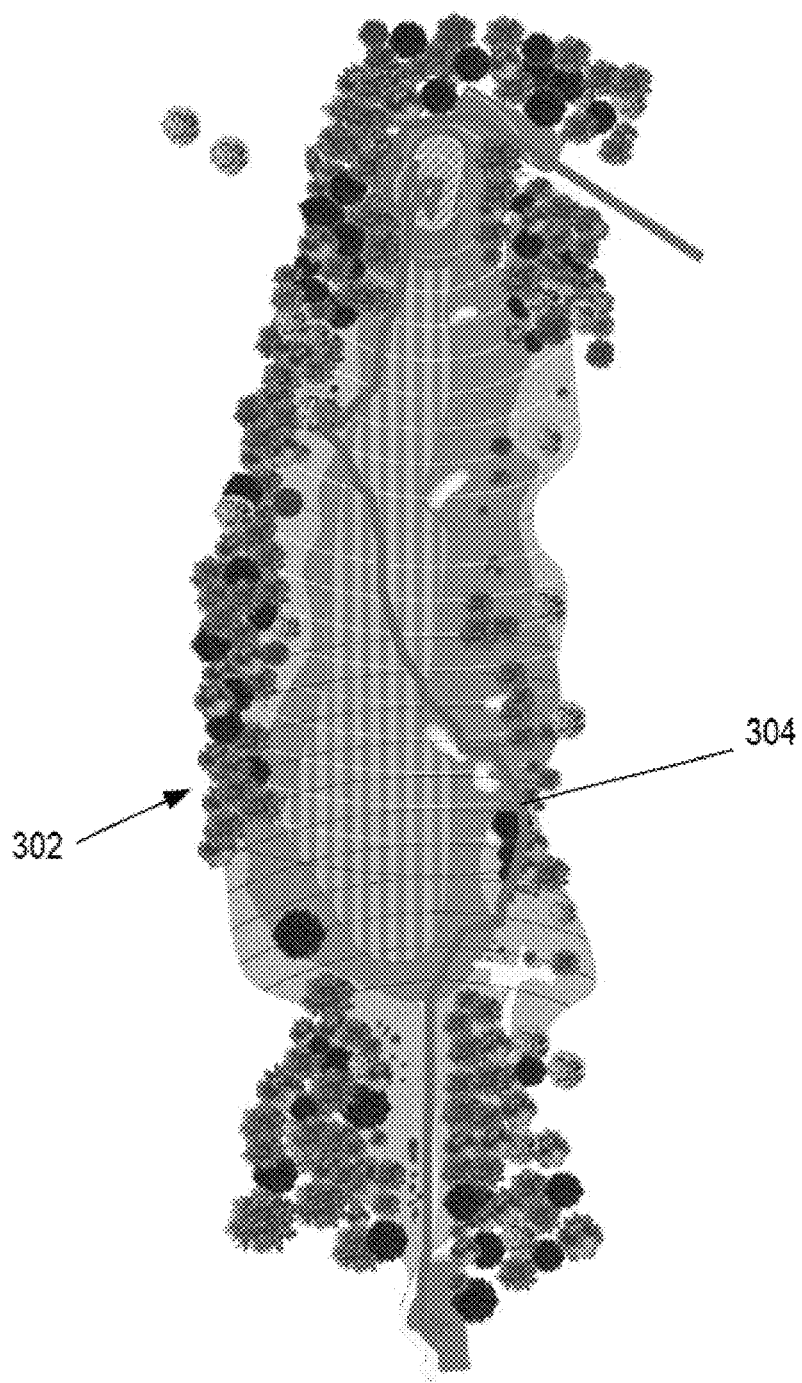
FIG. 3 shows a user interface according to one embodiment of the present disclosure.

FIG. 3 shows a representation of a user interface according to one embodiment of the present disclosure. The user interface 300 may be presented via interface 204 of device 200 of FIG. 2. The interface 300 may be presented to a user after a completion of the player's activity, such as a round of golf. The user interface 300 may show a visual representation 302 of one or more parts of a golf course, such as a particular hole. The visual representation 302 may be further overlayed with a motion trajectory 304 of the player which may be reconstructed from positional or location data of the player during the round of golf at the displayed hole.

The user interface 300 may further provide interactive elements (not shown) to enable a selection of a starting or tee position and a pin position, for example, by indicating the respective positions on the user interface 300 by tapping on the user interface 300 or using an input device, such as a mouse. Additionally or as an alternative, data on the tee position and pin position may also be retrieved from a database including descriptive data of the golf course, which data may be further adjusted by the user.

For example, the tee position may be determined by the user, which may be automatically aided by retrieved data of the hole, which may, for example, be provided by the database including respective data for a plurality of golf courses.

The interface 300 may include further interactive elements (not shown), such as a menu or buttons, to allow the user to enter a particular score played on the respective hole, such as par, birdie, eagle, double eagle or albatross, or bogey, double bogey, triple bogey and the like. The user interface 300 may further provide the user with data on the particular hole, such as a distance, the par and the like. The user may use a score card or other similar notes taken during the round of golf or recalled from memory in order to provide the respective data. The data on the particular score may be further used during estimation of individual positions of the ball. However, it is to be understood that embodiments of the present disclosure do not rely on respective user input and may rather automatically determine the individual positions of the ball based on an analysis of the motion trajectory 304 and/or further data of the player.

Figure 4:
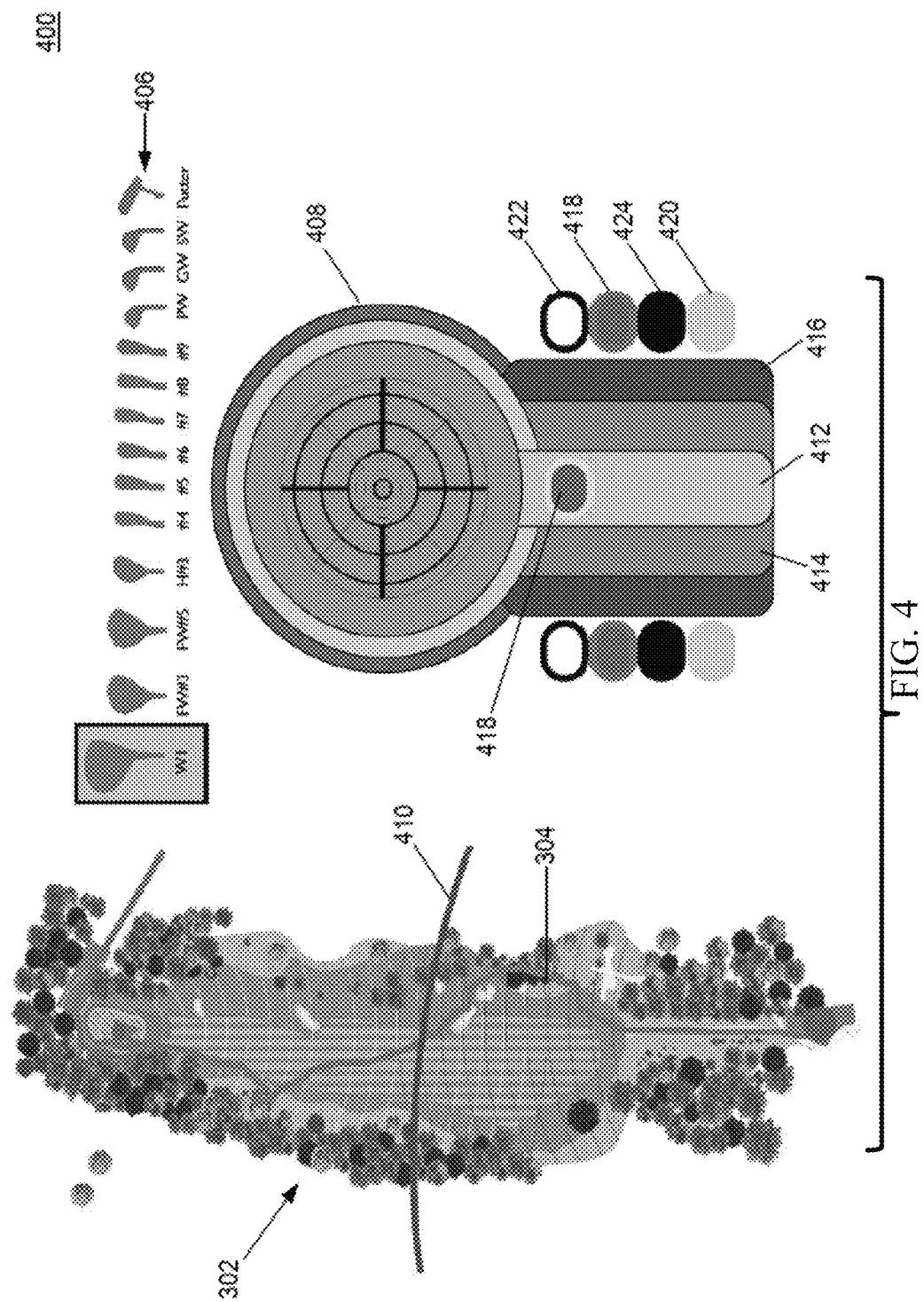
FIG. 4 shows another user interface according to one embodiment of the present disclosure.

FIG. 4 shows another user interface 400 which may be similar to the user interface 300 shown in FIG. 3. Accordingly, similar elements shown in FIG. 4 have been denoted using the same reference numerals as in FIG. 3. The user interface 400 may show a graphical representation 302 of a part of a golf course, such as a hole, which may be overlayed with a motion trajectory 304 of a player that may correspond to respective positions or locations of the player during the round of golf. The motion trajectory 304 may be used to estimate consecutive positions of the ball at the displayed hole. Furthermore, the user interface 400 may include interactive elements 406 and 408.

The interactive element 406 may enable the user to indicate a chosen club and/or lie for a current shot. For example, the interactive element 406 may provide an enumeration of individual clubs or a club set, such as driver, fairway, wood, iron, pitching wedge, gap wedge, sand wedge, a putter and the like. The interactive element 406 may also be customized for a particular player according to a predetermined selection of clubs. For example, the user may indicate a preferred club set used during the round of golf.

Based on the input of the user directed at a chosen club and/or lie a projected length 410 may be interactively displayed on the user interface 400, in order to aid the user with a selection of the particular club via interactive element 406.

The interactive element 408 may enable selection of a particular state of the golf course at an estimated position of the ball. The interactive element 408 may include indications of a state of the golf course, such as fairway 412, semi-rough 414 and rough 416, as well as indications of individual hazards, including one or more of a water hazard 418 and a bunker 420. The interactive element 408 may further be used to indicate that the ball is out of bounds or lost via interactive elements 422 and 424, respectively.

Based on the user input via user interface 400, a next position of the ball may be automatically estimated or an already estimated position based on the motion trajectory 304 may be refined according to the user input.

Each individual position of the ball, such as the tee position or the successive ball positions may be modified or adjusted during the processing at any time. According to the respective user input, the estimates of the features may be automatically refined. Furthermore, according to a particular state, such as ball in a bunker, a water hazard or out of bounds, a completely different position of the ball may be estimated by a user, for example, due to a free drop.

According to this example, if the ball lands in a water hazard, the golfer is allowed to continue with a free drop of a new ball at the water hazard under a penalty stroke. The identification of the state via user interface 400 may be required, since at least a similar situation could arise where the ball has not landed in the water hazard but directly in front of the water hazard which could coincide with the position of the free drop.

Figure 5:
FIG. 5 shows yet another user interface according to one embodiment of the present disclosure.

FIG. 5 shows a user interface according to one embodiment of the present disclosure. The user interface 500 may be similar to the user interfaces 300 and 400 as shown in FIGS. 3 and 4. Accordingly, similar elements in FIG. 5 have been denoted using the same reference numerals as in FIGS. 3 and 4. The user interface 500 may include a graphical representation 302 of a part of a golf course, such as a hole, which may be overlayed with a motion trajectory 304 of a player. Furthermore, user interface 500 may include an indication of a position of a ball. The position 512 may be, for example, automatically estimated based on an analysis of motion trajectory 304 and an interaction with user interface 400, including selection of a club and/or lie via interactive element 406. Additionally, or as an alternative, the user may mark the position 512 via user interface 500 or adjust the estimated position 512 via user interface 500.

The estimate of position 512 may, for example, be based on a characteristic temporal and spatial development of the motion trajectory 304 or further data of the player, which may be compared to one or more motion patterns and/or acceleration profiles, which may indicate a searching activity characterized as a repeated motion within a predefined range at a slow speed. Furthermore, the motion trajectory 304 and/or additional data, such as data from an accelerometer may indicate an acceleration or impact at a particular position which may be indicative of a shot, and/or the trajectory after a shot may indicate a speed-up to an average walking speed after the shot has been completed. In addition, motion or acceleration data from a sensor may be used to indicate a swing or a hit of the ball, which may be further used to validate the data, as described above. Furthermore, based on the visual representation 302 of the hole, the user may remember particular location of the ball and adjust or modify the estimated position 512.

The user interface 500 may further include a representation 514 indicating statistics, such as a drive length, a distance to pin and shot values.

After interaction with user interface 500, the user may be presented with another user interface which may be similar to the user interface 400 of FIG. 4, which may further allow a user to select a club and/or lie using interactive element 406 and which may further use interactive element 408 to indicate a state of the golf course at the estimated position 502 of the ball in order to provide further user input, which can be used to estimate a next position of the ball. However, it is to be understood that the next position of the ball may as well be automatically or semi-automatically estimated based on the motion trajectory 304 without any further interaction of the user.

The user interface 500 may include another interactive element (not shown) which may enable a user to individually evaluate and/or rate a current performance, such as the current shot using an individual quality metric.

Figure 6:
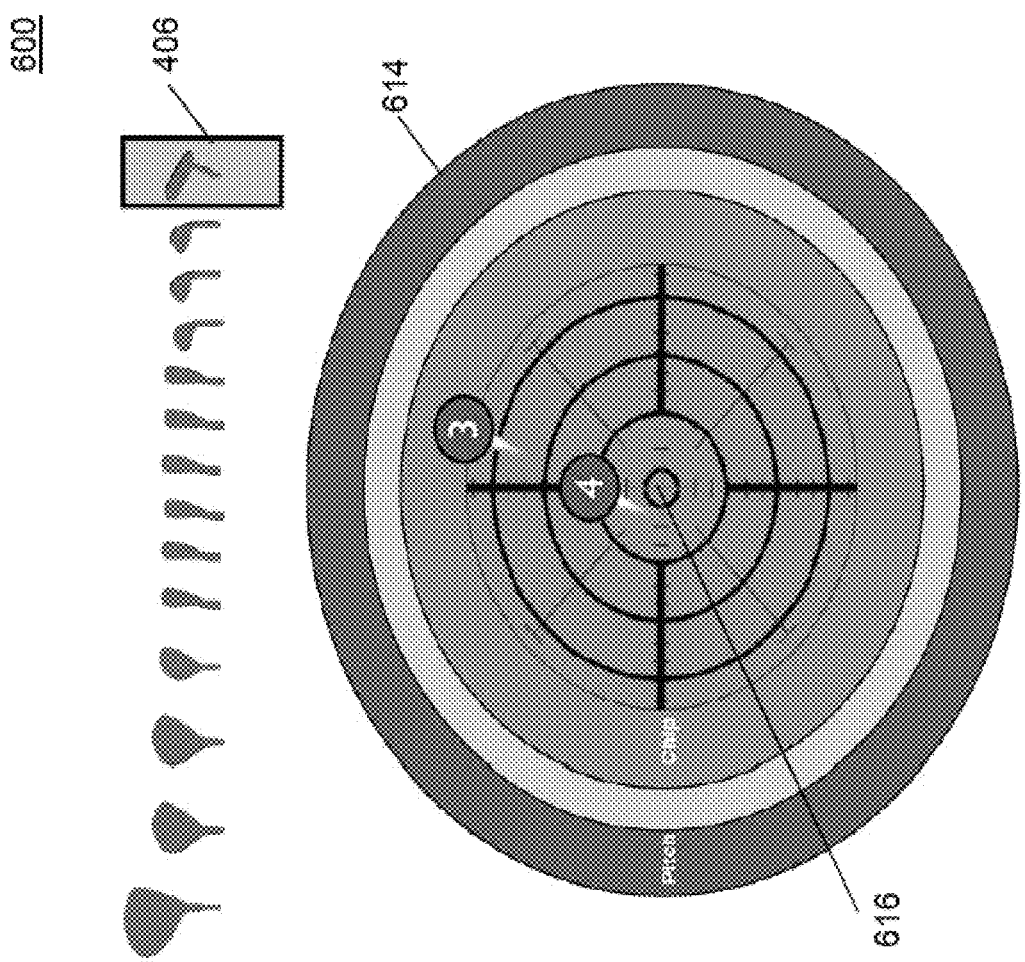
FIG. 6 shows a user interface according to one embodiment according to the present disclosure.
Figure 6:
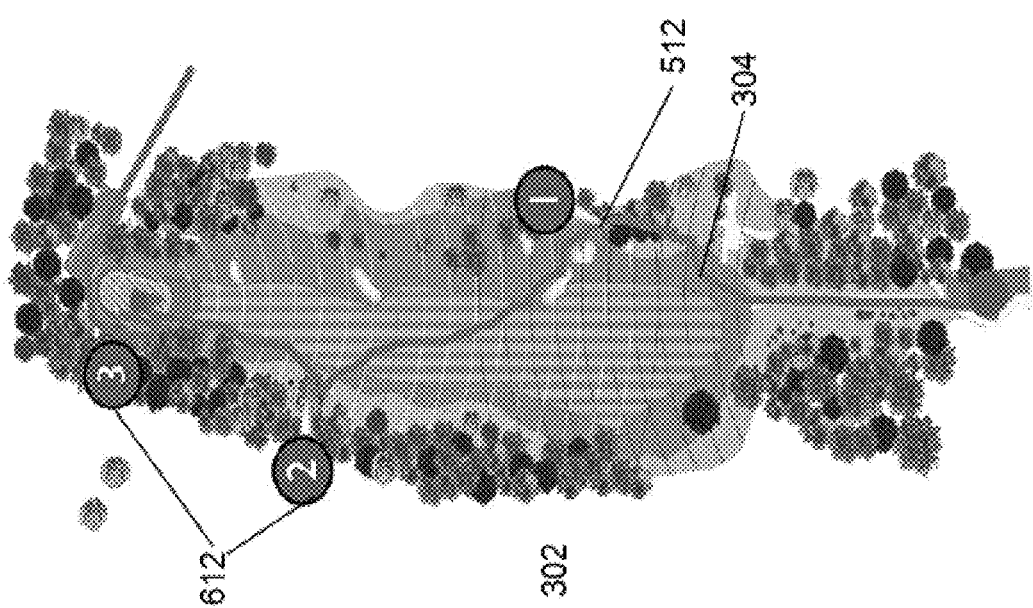

FIG. 6 shows a user interface according to one embodiment of the present disclosure which may be similar to the user interfaces 300, 400, 500 as shown in FIGS. 3 to 5, respectively. Accordingly, similar features have been denoted using the same reference numerals. The user interface 600 may include a graphical representation 302 of a part of a golf course, such as a hole, which may be overlayed with a motion trajectory 304 of a player.

The user interface 600 may further indicate several successive positions of a ball, such as positions 512, 612, which may be automatically estimated or semi-automatically estimated based on the motion trajectory 304 and further (iterative) input as discussed with regard to user interfaces 400 and 500 in FIGS. 4 and 5, respectively.

The user interface 600 may be presented after user interface 400 according to a particular position on the golf course. For example, interactive element 408 of interface 400 may be enlarged, resulting in interactive element 614, when a particular position of the ball is estimated on the green. The zoom of interactive element 408 to interactive element 614 may also be automatically done as soon as a particular club, e.g. the putter, has been selected via interactive element 406.

Interactive element 614 may aid the user to adjust the next positions of the ball on the green which may have been automatically estimated based on the motion trajectory. Interactive element 614 may further include several ranges indicative of a distance of a current position of the ball to the hole.

As soon as the user has adjusted the position in the center 616 or bulleye of interactive element 614, this may preferably be used as an indication that the ball is in the hole and that the particular hole has been successfully finished and the reconstruction of the round of golf may continue with analysis of the data related to a next hole, for example by iteratively providing the user interfaces 300, 400, 500 and 600 as shown in FIGS. 3 to 6, however, with a visual representation of the next hole and a corresponding motion trajectory on the next hole.

The determined score may be compared to an initially provided indication as discussed, for example, with regard to user interface 300 in FIG. 3 and adjusted accordingly. Furthermore, the user may be informed about any discrepancy and may adjust the respective processing.

The user interfaces 300 to 600 of FIGS. 3 to 6 may include further interactive elements which may, for example, enable the user to automatically add or mark photographs taken during a round of golf, as well as to add any further data or statistics, such as notes, audio data and the like.

Preferably, the interactive elements 300 to 600 of FIGS. 3 to 6, respectively, may be used to reconstruct a round of golf taking into consideration various situations of the round of golf, such as a ball which cannot be played, chip-in or hole in one, water hazards, a lost ball, penalties, free drops and the like. Furthermore, the statistics may include FiR (Fairway in Regulation), various deviations, shot statistics including length directed at individual clubs, GiR (Green in Regulation), precision of the shot, sand save, pitch and chip quotes (scrambeling), total putts per GiR, putt quota as based on a distance to the hole, as well as statistics directed at individual clubs, such as laylength per club, individual profiles with regard to a position of the balls with regard to the hole, shot quality according to one or more categories, and the like.

Figure 7:
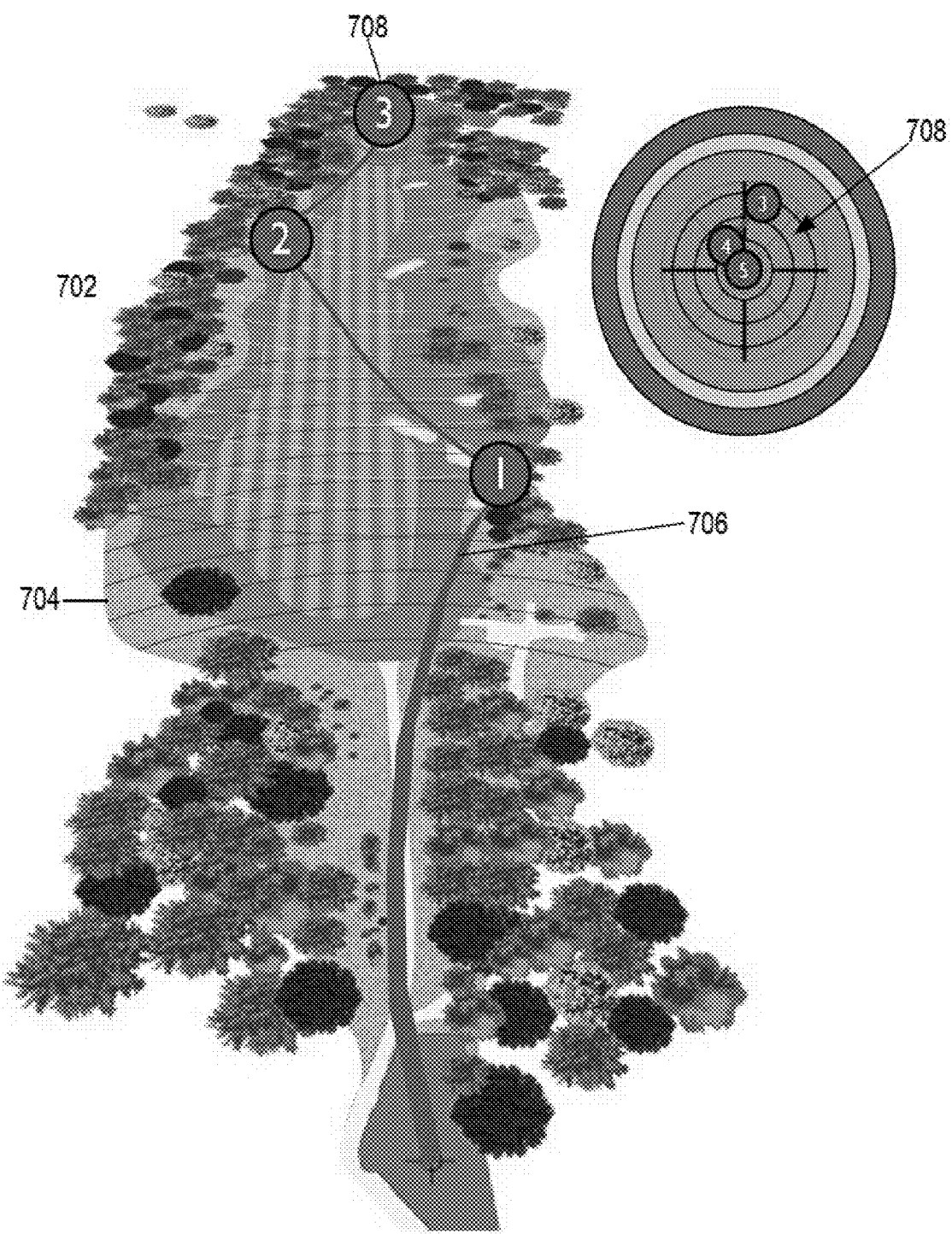
FIG. 7 shows a virtual reconstruction according to one embodiment of the present disclosure.

As shown in FIG. 7, which depicts an output of a reconstruction of a round of golf according to one embodiment of the present disclosure, the reconstructed round of golf, the individual shots and other data of the reconstruction may be used to generate a flyover or replay of the round of golf. The visual representation 702 may include visual representation 704 of the hole and the reconstructed shots 706 as well as positions 708 of the ball along the fairway and on the green. Furthermore, any additional information, such as notes, photographs, and audio data may be included in the visual representation 702. Preferably, the visual representation 702 may be adjusted by a user. For example, the visual representation 706 of a ball flight may be modified and the visual representation 702 may be regarded from any suitable perspective. Furthermore, the visual representation 702 may be provided as a virtual replay, wherein a camera may follow the flight path of the ball. The visual representation 702 may be an animated video sequence which may be provided as a media file or media stream. The animation may be fully interactive in that a user may adjust a viewing perspective at any time.

In a further preferred example, based on the reconstructed player's activity, detailed statistics may be generated to reflect the performance of the player.

Preferably, one or more embodiments of the present disclosure may be applicable in the following use case, wherein a golf player would like to reconstruct a played round of golf. So far, the only possibility to document the round of golf is to drag or document the score and to make additional handwritten notes. Typically, the memory of a player can store shots, the score, positions of the ball and the chosen club only for a short duration of time so that even the notes and the score cannot be reliably used after a couple of hours to document or reconstruct the played round of golf.

Based on one or more embodiments of the present disclosure, the player may reconstruct the round of golf based on his or her motion during the round of golf using GPS tracking functionality of the mobile phone or smartphone and/or small attachable sensors and/or additional information about shot activity of the player, for example using accelerometers and the like. After the round of golf, the player may use an application according to embodiments of the present disclosure to reconstruct the round of golf. The reconstruction may be automatic or semi-automatic based on the data tracked during the round of golf and may further take into account the laylength based on GPS measurements with personal shot statistics of a player and potential ball positions using GPS tracking and/or sensors. The reconstruction may be automatic or semi-automatic. In particular, the player may confirm estimated positions of the ball within a short period of time. Yet, the player may also change various details of the reconstruction.

Further to the reconstruction, one or more embodiments of the present disclosure may generate an animation, such as an animated film of the reconstructed round of golf, including statistics directed at the round of golf, which may be available for future use that may be used for analysis of personal strengths and weaknesses.

Preferably, one or more embodiments of the present disclosure may adapt to individual players by learning personal characteristics of a player based on a reconstructed round of golf, for example acceleration values, motion trajectories and the like. This may enable a completely automatic reconstruction of the round of golf.

The information on the player's activity and the data obtained during the activity may include various map data of the golf course, GPS data, motion patterns and the like. Furthermore, data from acceleration sensors and the motion trajectory as well as further data and information may be used and/or compared with the player-dependent characteristics in order to determine a selection of a club. For example, a shot of a length of 230 m may be indicative of a selection of a driver. Respective suggestions or estimate may be presented to a user via respective interactive elements, such as interactive element 406 and interfaces 400 and 600 in FIGS. 4 and 6, respectively.

Furthermore, RFID sensors may be combined with respective tags on individual clubs and the automatically obtained data may be used to estimate a current club selection during the reconstruction process.

Even though embodiments of the present disclosure have been described with regard to a round of golf, it is to be understood that the present disclosure is not limited to golfing only. Rather, embodiments of the present disclosure are applicable in any other player's activity, such as a sports activity or another ball game.

EMBODIMENTS

Embodiment 1

A computer-implemented method for reconstructing a player's activity, the method comprising:
retrieving data related to a player, obtained during an activity;
calculating estimates of features of the activity based on the data;
receiving user input related to the features responsive to at least one of the estimates; and
reconstructing at least a part of the activity based on the estimates and the user input.

Embodiment 2

The method of Embodiment 1, wherein said calculating of estimates includes analyzing one or more motion trajectories of the player tracked during the activity.

Embodiment 3

The method of Embodiment 2, wherein said activity includes an interaction of the player with one or more items, said calculating of estimates includes estimating one or more positions of the one or more items during the activity based on at least one of the motion trajectories of the player.

Embodiment 4

The method of Embodiment 3, wherein the data related to the player further includes data indicative of an interaction of the player with the one or more items.

Embodiment 5

The method of Embodiment 3, wherein the one or more positions of the one or more items are estimated based on temporal or spatial characteristics of the one or more motion trajectories of the player.

Embodiment 6

The method of Embodiment 5, wherein the temporal or spatial characteristics of the one or more motion trajectories of the player are analyzed in one or more ranges of the motion trajectories related to each estimated position of the one or more items.

Embodiment 7

The method of Embodiment 2, further comprising retrieving player-dependent characteristics and analyzing the motion trajectory according to the player-dependent characteristics.

Embodiment 8

The method of Embodiment 7, further comprising comparing the player-dependent characteristics with the estimated positions of the one or more items.

Embodiment 9

The method of Embodiment 7, further comprising updating the player-dependent characteristics based on the reconstructed activity.

Embodiment 10

The method of Embodiment 3, wherein said user input includes an adjustment of at least one of the estimated one or more positions of the one or more items.

Embodiment 11

The method of Embodiment 3, wherein said user input further includes data indicative of a next position of the one or more items, the method further comprising estimating the next position of the one or more items based on the motion trajectory of the player and said data indicative of the next position of the one or more items.

Embodiment 12

The method of Embodiment 3, further comprising receiving an indication of a number of consecutive positions of the one or more items during the activity.

Embodiment 13

The method of Embodiment 1, further comprising generating a replay of the reconstructed activity.

Embodiment 14

The method of Embodiment 1, wherein the activity is a round of golf.

Embodiment 15

The method of Embodiment 14, wherein said calculating of estimates further includes taking into consideration data indicative of a golf course on which the round of golf was played.

Embodiment 16

The method of Embodiment 15, further comprising receiving user input indicative of a state of the golf course at an estimated position of the ball.

Embodiment 17

The method of Embodiment 1, further comprising calculating statistics of the player.

Embodiment 18

A device for reconstructing a player's activity, comprising:
a memory configured to store data related to a player, said data obtained during an activity of the player;
an input interface; and
a processor configured to retrieve the data, calculate estimates of features of the activity based on the data, receive, via the input interface, user input related to the features responsive to at least one of the estimates, and reconstruct at least a part of the activity based on the estimates and the user input.

Embodiment 19

The device of Embodiment 18, further comprising one or more sensors configured to obtain said data and store the data into the memory, the one or more sensors including at least one of a GPS sensor, an accelerometer, an RFID sensor, and an optical sensor.

Embodiment 20

The device of Embodiment 18, wherein the device is a portable electronic device, including a tablet computer, a smartphone or a smart watch.

Aspects of the invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, transitory and non-transitory, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile disks (DVD), holographic media or other optical disk storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

While some embodiments have been described in detail it is to be understood that aspects of the disclosure can take many forms. In particular, the claimed subject matter may be practiced or implemented differently from the examples described and the described features and characteristics may be practiced or implemented in any combination. The embodiments shown herein are intended to illustrate rather than to limit the invention as defined by the claims.

The invention claimed is:

1. A computer-implemented method for reconstructing a player's activity on a device, the method comprising:
retrieving or receiving, by a processor of the device, data related to a player from a memory of the device, wherein the data includes tracking data obtained from one or more sensors associated with the player during an activity, at least some of the tracking data referring to position data of the player during the activity, wherein at least one or the one or more sensors is attached to the body or clothing of the player or included in a portable device carried by the player during the activity, the activity including an interaction of the player with one or more items;
calculating estimates of features of the activity based on the data, including:
analyzing one or more motion trajectories of the player tracked during the activity, each motion trajectory reflecting a series of positions of the player during the activity or a motion of body parts of the player during the activity; and estimating one or more positions of the one or more items during the activity based on at least one motion trajectory of the one or more motion trajectories of the player;

presenting, via a user interface of the device, at least one of the estimates;

receiving, via the user interface, user input related to the features of the activity responsive to presenting the at least one of the estimates; and reconstructing at least a part of the activity based on the estimates of features of the activity and the user input.

2. The computer-implemented method according to claim 1, wherein the data related to the player includes data indicative of an interaction of the player with the one or more items.

3. The computer-implemented method according to claim 1, wherein the one or more positions of the one or more items are estimated based on temporal or spatial characteristics of the one or more motion trajectories of the player indicative of an interaction of the player with at least one of the one or more items.

4. The computer-implemented method according to claim 3, wherein the temporal or spatial characteristics of the one or more motion trajectories of the player are analyzed in one or more ranges of the one or more motion trajectories related to each estimated position of the one or more items.

5. The computer-implemented method according to claim 1, further comprising retrieving player-dependent characteristics and analyzing the one or more motion trajectories according to the player-dependent characteristics.

6. The computer-implemented method according to claim 5, further comprising comparing the player-dependent characteristics with the estimated one or more positions of the one or more items.

7. The computer-implemented method according to claim 5, further comprising updating the player-dependent characteristics based on the reconstructed at least part of the activity.

8. The computer-implemented method according to claim 1, wherein the user input includes an adjustment of at least one of the estimated one or more positions of the one or more items.

9. The computer-implemented method according to claim 1, wherein the user input further includes data indicative of a next position of the one or more items, the method further comprising estimating the next position of the one or more items based on the motion trajectory at least one of the one or more motion trajectories of the player and the data indicative of the next position of the one or more items.

10. The computer-implemented method according to claim 1, further comprising receiving an indication of a number of consecutive positions of the one or more items during the activity.

11. The computer-implemented method according to claim 1, further comprising generating a replay of the reconstructed at least a part of the activity.

12. The computer-implemented method according to claim 1, wherein the activity is a round of golf.

13. The computer-implemented method according to claim 12, wherein calculating estimates of features of the activity based on the data includes taking into consideration data indicative of a golf course on which the round of golf was played.

14. The computer-implemented method according to claim 13, further comprising receiving user input indicative of a state of the golf course at an estimated position of a ball.

15. The computer-implemented method according to claim 1, further comprising calculating statistics of the player.

16. A device for reconstructing a player's activity, comprising:

a memory, wherein the memory is configured to store data related to a player, wherein the data includes tracking data obtained from one or more sensors associated with the player during an activity of the player, at least some of the tracking data referring to position data of the player during the activity, wherein at least one of the one or more sensors is attached to the body or clothing of the player or included in a portable device carried by the player during the activity, the activity including an interaction of the player with one or more items;

a user interface, including an input interface; and a processor, wherein the processor is configured to:
retrieve or receive the data;
calculate estimates of features of the activity based on the data, including
analyzing one or more motion trajectories of the player tracked during the activity, each motion trajectory reflecting a series of positions of the player during the activity or a motion of body parts of the player during the activity; and
estimating one or more positions of the one or more items during the activity based on at least one motion trajectory of the one or more motion trajectories of the player;
present, via the user interface, at least one of the estimates;
receive, via the input interface, user input related to the features of the activity responsive to the presented at least one of the estimates of features of the activity based on the data; and
reconstruct at least a part of the activity based on the estimates of features of the activity based on the data and the user input.

17. A non-transitory computer readable medium containing a set of instructions that when executed cause a computer to perform a method for reconstructing a player's activity, the method comprising:

retrieving or receiving data related to a player from a memory of the computer, wherein the data includes tracking data obtained from one or more sensors associated with the player during an activity, at least some of the tracking data referring to position data of the player during the activity, wherein at least one of the one or more sensors is attached to the body or clothing of the player or included in a portable device carried by the player during the activity, the activity including an interaction of the player with one or more items;

calculating estimates of features of the activity based on the data, including:
analyzing one or more motion trajectories of the player tracked during the activity, each motion trajectory reflecting a series of positions of the player during the activity or a motion of body parts of the player during the activity; and
estimating one or more positions of the one or more items during the activity based on at least one motion trajectory of the one or more motion trajectories of the player;

presenting, via a user interface of the computer, at least one of the estimates;
receiving, via the user interface, user input related to the features of the activity responsive to presenting the at least one of the estimates; and
reconstructing at least a part of the activity based on the estimates of features of the activity and the user input.

\* \* \* \* \*